(12) United States Patent
Liu

(10) Patent No.: US 11,317,291 B2
(45) Date of Patent: Apr. 26, 2022

(54) DATA PROCESSING METHOD, ACCESS NETWORK DEVICE, AND CORE NETWORK DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/988,544

(22) Filed: Aug. 7, 2020

(65) Prior Publication Data

US 2020/0374701 A1    Nov. 26, 2020

Related U.S. Application Data

(63) Continuation of application No. PCT/CN2018/116551, filed on Nov. 20, 2018.

(30) Foreign Application Priority Data

Mar. 15, 2018   (WO) ................ PCT/CN2018/079200

(51) Int. Cl.
*H04W 12/08* (2021.01)
*H04W 12/128* (2021.01)
*H04W 28/02* (2009.01)
*H04W 12/72* (2021.01)
*H04W 12/106* (2021.01)

(52) U.S. Cl.
CPC .......... *H04W 12/128* (2021.01); *H04W 12/08* (2013.01); *H04W 12/106* (2021.01); *H04W 12/72* (2021.01); *H04W 28/0268* (2013.01)

(58) Field of Classification Search
CPC ....... H04W 12/1006; H04W 12/00514; H04W 12/08; H04W 28/0268
See application file for complete search history.

(56) References Cited

U.S. PATENT DOCUMENTS 8,295,188 B2   10/2012  Elrod
8,429,399 B2   4/2013   Norrman
(Continued)

FOREIGN PATENT DOCUMENTS

CN   1889767 A   1/2007
CN   1889767   *   3/2007   ............ H04W 12/02
(Continued)

OTHER PUBLICATIONS

English translation of the Written Opinion of the International Search Authority in the international application No. PCT/CN2018/116551, dated Jan. 31, 2019.
(Continued)

*Primary Examiner* — Myron Wyche
(74) *Attorney, Agent, or Firm* — Perkins Coie LLP

(57) ABSTRACT

A data processing method, an access network device, and a core network device are provided. The method comprises: the access network device receives first information sent by the core network device or a terminal device; the access network device determines, according to the first information, whether to perform security processing on data to be processed.

27 Claims, 3 Drawing Sheets

(56) References Cited

U.S. PATENT DOCUMENTS

| | | | |
|---|---|---|---|
| 2008/0240128 A1 | 10/2008 | Elrod | |
| 2010/0115275 A1* | 5/2010 | Suh | H04W 12/08 713/168 |
| 2010/0263040 A1 | 10/2010 | Norrman | |
| 2010/0287602 A1 | 11/2010 | Xia | |
| 2011/0136473 A1 | 6/2011 | Gupta | |
| 2012/0307709 A1 | 12/2012 | Oestergaard | |
| 2015/0143463 A1 | 5/2015 | Baghel et al. | |
| 2018/0270668 A1 | 9/2018 | Nair | |
| 2020/0228975 A1 | 7/2020 | Li et al. | |

FOREIGN PATENT DOCUMENTS

| | | | |
|---|---|---|---|
| CN | 101001410 A | 7/2007 | |
| CN | 101128066 A | 2/2008 | |
| CN | 101188498 A | 5/2008 | |
| CN | 101222749 A | 7/2008 | |
| CN | 102083062 A | 6/2011 | |
| CN | 102124766 A | 7/2011 | |
| CN | 102149088 A | 8/2011 | |
| CN | 102457560 A | 5/2012 | |
| CN | 102932382 A | 2/2013 | |
| CN | 104935593 A | 9/2015 | |
| CN | 106161378 A | 11/2016 | |
| CN | 106603427 A | 4/2017 | |
| EP | 1770940 A1 | 4/2007 | |
| EP | 2234368 A1 | 9/2010 | |
| EP | 345752 * | 3/2019 | H04W 36/06 |
| KR | 20120117731 A | 10/2012 | |
| WO | 2009043622 A1 | 4/2009 | |
| WO | 2012078092 A2 | 6/2012 | |
| WO | 2017138768 A1 | 8/2017 | |
| WO | 2017172450 A1 | 10/2017 | |
| WO | 2017219365 A1 | 12/2017 | |

OTHER PUBLICATIONS

English translation of the Written Opinion of the International Search Authority in the international application No. PCT/CN2018/079200, dated Dec. 12, 2018.

"3rd Generation Partnership Project; Technical Specification Group Radio Access Network; NR; Packet Data Convergence Protocol (PDCP) specification (Release 15)",3GPP TS 38.323 V15.1.0 (Mar. 2018), http://www.3gpp.org.

"3rd Generation Partnership Project; Technical Specification Group Services and System Aspects; Procedures for the 5G System; Stage 2(Release 15)", 3GPP TS 23.502 V15.0.0 (Dec. 2017), http://www.3gpp.org.

Nokia: "pCR UP integrity security solution per bearer" 3GPP Draft; S3-171352 UP Integrity Security Solution per Bearer, 3rd Generation Partnership Project (3GPP), Mobile Competence Centre; 650, Route Des Lucioles; F-06921 Sophia-Antipolis Cedex; France, vol. SA WG3, No. Ljubljana, Slovenia; May 15, 2017-May 19, 2017, May 14, 2017 (May 14, 2017), XP051282847 [ retrieved on May 14, 2017]* the whole document *.

Qualcomm Incorporated: "Usage of data integrity protection for DRB in NR" 3GPP Draft; R2-1711520 Usage of Data Integrity Protection for DRB in NR, 3rd Generation Partnership Project (3GPP), Mobile Competence Centre; 650, Route Des Lucioles: F-06921 Sophia-Antipolis Cedex, vol. RAN WG2, No. Prague, Czech Republic; Oct. 9, 2017-Oct. 13, 2017, Oct. 8, 2017 (Oct. 8, 2017), XP051343490, [retrieved on Oct. 8, 2017]the whole document *.

Supplementary European Search Report in the European application No. 17931697.1, dated Aug. 28, 2020.
International Search Report in the international application No. PCT/CN2017/109805, dated Feb. 2, 2018.
English translation of the Written Opinion of the International Search Authority in the international application No. PCT/CN2017/109805, dated Feb. 2, 2018.
International Search Report in the international application No. PCT/CN2018/116551, dated Jan. 31, 2019.
International Search Report in the international application No. PCT/CN2018/079200, dated Dec. 12, 2018.
Supplementary European Search Report in the European application No. 18909699.3, dated Dec. 14, 2020.
First Office Action of the Chinese application No. 202010389051.3, dated Jun. 3, 2021.
First Office Action of the European application No. 17931697.1, dated Jun. 1, 2021.
First Office Action of the Chinese application No. 202010671394.9, dated Jul. 7, 2021. 24 pages with English translation.
ZTE Corporation, "Consideration on UP integrity configuration", 3GPP TSG RAN WG2 Meeting #99bis R2-1710314, Prague, Czech Republic, Oct. 9-13, 2017. 3 pages.
Qualcomm Incorporated, "Access Stratum Security aspects of E-UTRAN connected to 5GCN", 3GPP TSG-RAN2 Meeting #99bis R2-1710159, Prague, Czech Republic, Oct. 9-13, 2017. 5 pages.
Second Office Action of the Chinese application No. 202010389051.3, dated Aug. 13, 2021. 16 pages with English translation.
First Office Action of the U.S. Appl. No. 16/868,273, dated Jul. 16, 2021. 26 pages.
First Office Action of the Korean application No. 10-2020-7015919, dated Jul. 9, 2021, 6 pages with English translation.
Office Action of the Indian application No. 202017044229, dated Sep. 9, 2021. 5 pages with English translation.
First Office Action of the Canadian application No. 3093721, dated Sep. 17, 2021. 4 pages.
3GPP TS 33.401 V14.2.0 (Mar. 2017), 3rd Generation Partnership Project; Technical Specification Group Services and System Aspects; 3GPP System Architecture Evolution (SAE); Security architecture (Release 14). 152 pages.
3GPP TS 36.331 V14.2.2 (Apr. 2017), 3rd Generation Partnership Project; Technical Specification Group Radio Access Network; Evolved Universal Terrestrial Radio Access (E-UTRA); Radio Resource Control (RRC); Protocol specification (Release 14). 711 pages.
Huawei, HiSilicon, GBR QoS Flows for UL, 3GPP TSG RAN WG2 adhoc_2017_06_NR R2-1706781, 3GPP, Jun. 17, 2017. 2 pages.
First Office Action of the Japanese application No. 2020-524636, dated Oct. 19, 2021. 8 pages with English translation.
Office Action of the Indian application No. 202027023124, dated Nov. 16, 2021. 5 pages with English translation.
Final Office Action of the U.S. Appl. No. 16/868,273, dated Nov. 26, 2021. 20 pages.
Second Office Action of the European application No. 17931697.1, dated Nov. 23, 2021. 4 pages.
Notice of Allowance of the Korean application No. 10-2020-7015919, dated Nov. 26, 2021. 3 pages with English translation.
First Office Action of the Taiwanese application No. 107139366, dated Nov. 30, 2021. 10 pages with English translation.
Ericsson, QoS—Continuation of stage 3 work, 3GPP TSG RAN WG3 #96 R3-171708, 3GPP, May 6, 2017, 14 pages.
Second Office Action of the Japanese application No. 2020-524636, dated Feb. 4, 2022. 6 pages with English translation.
Notice of Advisory Action of the U.S. Appl. No. 16/868,273, dated Feb. 7, 2022. 5 pages.

* cited by examiner

DATA PROCESSING METHOD, ACCESS NETWORK DEVICE, AND CORE NETWORK DEVICE

CROSS-REFERENCE TO RELATED APPLICATION

This is a continuation application of International Patent Application No. PCT/CN2018/116551, filed on Nov. 20, 2018, which claims priority to PCT Patent Application No. PCT/CN2018/079200, filed with the Chinese Patent Office on Mar. 15, 2018 and entitled "DATA PROCESSING METHOD, ACCESS NETWORK DEVICE, AND CORE NETWORK DEVICE", which is incorporated herein by reference in its entirety.

BACKGROUND

In a communications system, data usually requires security processing such as integrity protection and/or encryption processing before transmission. However, in practice, some data can be reliably transmitted without security processing. Security processing of such data may degrade the performance of data transmission.

SUMMARY

Embodiments of this disclosure relate to the communications field.

In view of this, this disclosure provides a data processing method, an access network device, and a core network device. The access network device determines, according to auxiliary information sent by the core network device or a terminal device, whether to perform security processing on to-be-processed data, thereby improving the performance of data transmission.

According to a first aspect, a data processing method is provided. The method includes: receiving, by an access network device, first information sent by a core network device or a terminal device; and determining, by the access network device according to the first information, whether to perform security processing on to-be-processed data.

In a possible implementation, the receiving, by an access network device, first information sent by a core network device or a terminal device includes: receiving, by the access network device, the first information sent by the core network device, where the first information is used for indicating one type of the following information: security processing is required to be performed on the to-be-processed data, security processing is not needed to be performed on the to-be-processed data, and a recommendation of whether to perform security processing on the to-be-processed data.

In a possible implementation, the determining, by the access network device according to the first information, whether to perform security processing on to-be-processed data includes: when the first information indicates the recommendation of whether to perform security processing on the to-be-processed data, determining, by the access network device according to subscription information of the terminal device and/or capability information of the terminal device, whether to perform security processing on the to-be-processed data.

In a possible implementation, the determining, by the access network device according to capability information of the terminal device, whether to perform security processing on the to-be-processed data includes: determining, by the access network device according to a maximum data rate that can be supported by the terminal device to perform security processing, whether to perform security processing on the to-be-processed data.

In a possible implementation, the determining, by the access network device according to a maximum data rate that can be supported by the terminal device to perform security processing, whether to perform security processing on the to-be-processed data includes: determining, by the access network device, to perform security processing on the to-be-processed data in a first quality of service (QoS), a first protocol data unit (PDU) session or a first bearer, where a data rate of the first QoS, a data rate of the first PDU session or a data rate of the first bearer is less than or equal to the maximum data rate; or determining to perform security processing on the to-be-processed data in a plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate.

In a possible implementation, the determining, by the access network device according to a maximum data rate that can be supported by the terminal device to perform security processing, whether to perform security processing on the to-be-processed data includes: when a data rate assessed by the access network device is less than or equal to the maximum data rate, determining, by the access network device, to perform security processing on the to-be-processed data.

In a possible implementation, the subscription information of the terminal device and/or the capability information of the terminal device are/is provided by the core network device or the terminal device.

In a possible implementation, the first information is used for indicating the subscription information of the terminal device and/or the capability information of the terminal device.

According to a second aspect, a data processing method is provided. The method includes: sending, by a core network device, first information to an access network device, where the first information is used for the access network device to determine whether to perform security processing on to-be-processed data.

In a possible implementation, the first information is used for indicating one type of the following information: security processing is required to be performed on the to-be-processed data, security processing is not needed to be performed on the to-be-processed data, and a recommendation of whether to perform security processing on the to-be-processed data.

In a possible implementation, the method further includes: determining, by the core network device according to subscription information of a terminal device and/or capability information of the terminal device, whether to perform security processing on the to-be-processed data.

In a possible implementation, the determining, by the core network device according to capability information of the terminal device, whether to perform security processing on the to-be-processed data includes: determining, by the core network device according to a maximum data rate that can be supported by the terminal device to perform security processing, whether to perform security processing on the to-be-processed data.

In a possible implementation, the determining, by the core network device according to a maximum data rate that can be supported by the terminal device to perform security processing, whether to perform security processing on the to-be-processed data includes: determining, by the core network device, to perform security processing on the to-be-processed data in a first QoS, a first PDU session or a first bearer, where a data rate of the first QoS, a data rate of the first PDU session or a data rate of the first bearer is less than or equal to the maximum data rate; or determining, by the core network device, to perform security processing on the to-be-processed data in a plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate.

In a possible implementation, the first information is used for indicating the subscription information of the terminal device and/or the capability information of the terminal device.

According to a third aspect, an access network device is provided to perform the method according to the first aspect or any possible implementation of the first aspect. Specifically, the access network device includes a unit configured to perform the method according to the first aspect or any possible implementation of the first aspect.

According to a fourth aspect, a core network device is provided to perform the method according to the second aspect or any possible implementation of the second aspect. Specifically, the core network device includes a unit configured to perform the method according to the second aspect or any possible implementation of the second aspect.

According to a fifth aspect, an access network device is provided. The access network device includes: a memory, a processor, an input interface, and an output interface. The memory, the processor, the input interface, and the output interface are connected by a bus system. The memory is configured to store an instruction. The processor is configured to perform the instruction stored in the memory, to perform the method according to the first aspect or any possible implementation of the first aspect.

According to a sixth aspect, a core network device is provided. The core network device includes: a memory, a processor, an input interface, and an output interface. The memory, the processor, the input interface, and the output interface are connected by a bus system. The memory is configured to store an instruction. The processor is configured to perform the instruction stored in the memory, to perform the method according to the second aspect or any possible implementation of the second aspect.

According to a seventh aspect, a computer storage medium is provided. The computer storage medium is configured to store a computer software instruction that is used for performing the method according to the first aspect or any possible implementation of the first aspect, or the method according to the second aspect or any possible implementation of the second aspect, and the computer software instruction includes a program designed to perform the foregoing aspect.

According to an eighth aspect, a computer program product including an instruction is provided, and when the computer program product is run on a computer, the computer is enabled to perform the method according to the first aspect or any one of optional implementations of the first aspect, or the method according to the second aspect or any one of optional implementations of the second aspect.

According to a ninth aspect, a computer program is provided, and when the computer program is run on a computer, the computer is enabled to perform the method according to any aspect or each implementation of the first aspect and the second aspect.

These aspects or other aspects of this disclosure are simpler and more comprehensible in descriptions of the following embodiments.

DETAILED DESCRIPTION

Figure 1:
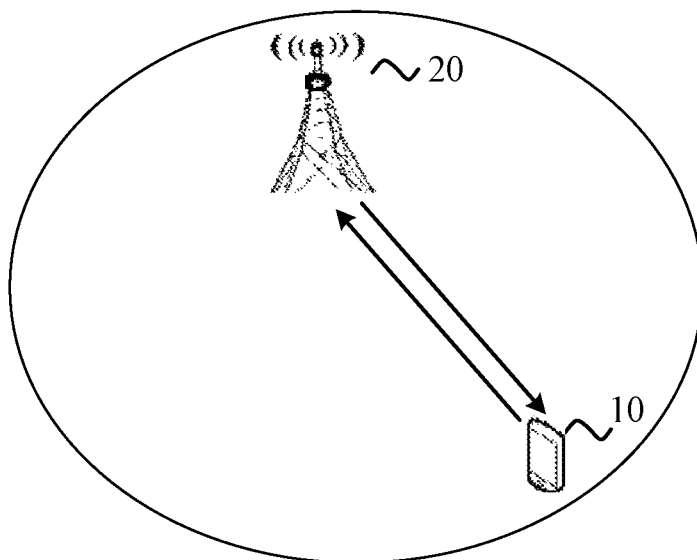
FIG. 1 is a schematic diagram of an application scenario according to an implementation of this disclosure.

The technical solutions in the embodiments of this disclosure are clearly and completely described with reference to the accompanying drawings in the embodiments of this disclosure below.

It should be understood that the technical solutions of the embodiments of this disclosure may be applied to various communications systems such as a global system for mobile communications (GSM) system, a code division multiple access (CDMA) system, a wideband code division multiple access (WCDMA) system, a general packet radio service (GPRS), a long term evolved (LTE) system, an LTE frequency division duplex (FDD) system, an LTE time division duplex (TDD) system, a universal mobile telecommunication system (UMTS), a worldwide interoperability for microwave access (WiMAX) communications system, a new radio (NR) system or a future 5G system.

Particularly, the technical solutions of the embodiments of this disclosure may be applied to various communications systems based on a non-orthogonal multiple access technology, for example, a sparse code multiple access (SCMA) system and a low density signature (LDS) system. Certainly, the SCMA system and the LDS system may also be referred to as other names in the communications field. Further, the technical solutions of the embodiments of this disclosure may be applied to multi-carrier transmission systems in which the non-orthogonal multiple access technology is used, for example, an orthogonal frequency division multiplexing (OFDM) system, a filter bank multi-carrier (FBMC) system, a generalized frequency division multiplexing (GFDM) system, and a filtered-OFDM (F-OFDM) system in which the non-orthogonal multiple access technology is used.

A terminal device in the embodiments of this disclosure may be user equipment (UE), an access terminal, a subscriber unit, a subscriber station, a mobile station, a mobile console, a remote station, a remote terminal, a mobile device, a user terminal, a terminal, a wireless communications device, a user agent or a user apparatus. The access terminal may be a cellular phone, a cordless phone, a session initiation protocol (SIP) phone, a wireless local loop (WLL) station, a personal digital assistant (PDA), a handheld device having a wireless communications function, a computing device, another processing device connected to a wireless modem, an in-vehicle device, a wearable device, a terminal device in a future 5G network, a terminal device in a future evolved public land mobile network (PLMN) or the like. This is not limited in the embodiments of this disclosure.

A network device in the embodiments of this disclosure may be a device configured to communicate with the terminal device. The network device may be a base transceiver station (BTS) in GSM or CDMA, or may be a NodeB (NB) in a WCDMA system, or may be an evolved NodeB (eNB or eNodeB) in an LTE system, or may be a wireless controller in a cloud radio access network (CRAN) scenario, or the network device may be a relay station, an access point, an in-vehicle device, a wearable device, a network device in the future 5G network, a network device in a future evolved PLMN network, or the like. This is not limited in the embodiments of this disclosure.

FIG. 1 is a schematic diagram of an application scenario according to an implementation of this disclosure. A communications system in FIG. 1 may include a terminal device 10 and a network device 20. The network device 20 is configured to provide a communications service for the terminal device 10 and access a core network, and the terminal device 10 accesses the network by searching for a synchronization signal, a broadcast signal, and the like sent by the network device 20, thereby communicating with the network. An arrow shown in FIG. 1 may indicate uplink/downlink transmission performed over a cellular link between the terminal device 10 and the network device 20.

In the communications system, security processing is required to be performed before data transmission. For example, it is necessary to perform integrity protection and/or encryption processing on data. However, in practice, a part of data can be transmitted reliably without security processing, and if security processing has been performed on the part of data, the performance of data transmission may be reduced.

Under such a condition, an embodiment of this disclosure provides a data processing method, which is conducive to improving the performance of data transmission.

Figure 2:
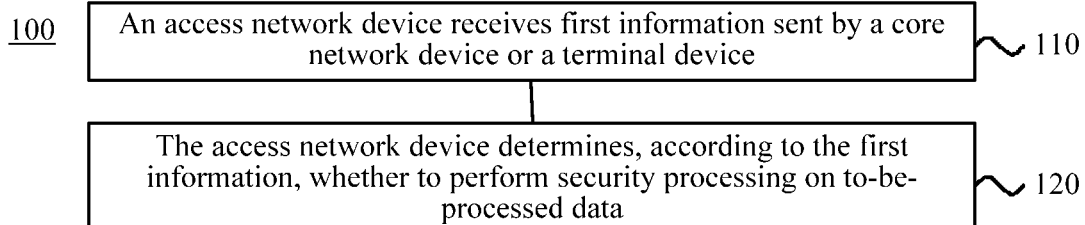
FIG. 2 is a schematic block diagram of a data processing method according to an implementation of this disclosure.

FIG. 2 is a schematic block diagram of a data processing method 100 according to an implementation of this disclosure. As shown in FIG. 2, the method 100 includes some or all of the following content:

S110: An access network device receives first information sent by a core network device or a terminal device.

S120: The access network device determines, according to the first information, whether to perform security processing on to-be-processed data.

Specifically, the access network device may obtain some auxiliary information from the core network device or the terminal device, to determine whether to perform security processing on the to-be-processed data. For example, the access network device may obtain subscription information of the terminal device and/or capability information of the terminal device from the core network device or the terminal device, to accordingly determine whether to perform security processing on the to-be-processed data. Alternatively, the core network device may first determine whether to perform security processing on the to-be-processed data, and then notify a determination result to the access network device, to instruct the access network device to perform security processing on the to-be-processed data or to instruct the access network device not to perform security processing on the to-be-processed data; or notify a tendentious suggestion of the core network device to the access network device, for example, recommend that the access network device should perform security processing on the to-be-processed data, or recommend that the access network device should not perform security processing on the to-be-processed data.

Therefore, in the data processing method provided in this embodiment of this disclosure, it is determined, according to the auxiliary information obtained from the core network device or the terminal device, whether to perform security processing on the to-be-processed data, which is conducive to improving the performance of data transmission.

Optionally, in this embodiment of this disclosure, the receiving, by an access network device, first information sent by a core network device or a terminal device includes: receiving, by the access network device, the first information sent by the core network device, where the first information is used for indicating one type of the following information: security processing is required to be performed on the to-be-processed data, security processing is not needed to be performed on the to-be-processed data, and a recommendation of whether to perform security processing on the to-be-processed data.

As mentioned above, the core network device may first determine whether to perform security processing on the to-be-processed data, and then indicate a determination result to the access network device. For example, the core network device and the access network device may agree in advance to use two bits to indicate the above results. 00 represents that security processing is required to be performed on the to-be-processed data, 01 represents that security processing is not needed to be performed on the to-be-processed data, 10 represents that the core network device recommends that the access network device should perform security processing on the to-be-processed data, 11 represents that the core network device recommends that the access network device should not perform security processing on the to-be-processed data, and the like. That is, when the access network device receives 00, the access network device may directly perform security processing on the to-be-processed data. When the access network device receives 01, the access network device may not perform security processing on the to-be-processed data. When the access network device receives 10 or 11, the access network device may further combine other information to determine whether to perform security processing on the to-be-processed data. It should be understood that, the foregoing is merely for illustrative description, and this embodiment of this disclosure is not limited thereto.

Optionally, in this embodiment of this disclosure, the to-be-processed data may include uplink data and/or downlink data. The first information may include information used for the terminal device to perform uplink processing and/or information used for the terminal device to perform downlink processing. That is, the access network device may perform security processing on the uplink data according to the information used for the terminal device to perform uplink processing, or, the access network device may perform security processing on the uplink data according to the information used for the terminal device to perform uplink processing and the information used for the terminal device to perform downlink processing. The access network device may perform security processing on the downlink data according to the information used for the terminal device to perform downlink processing, or, the access network device may perform security processing on the downlink data according to the information used for the terminal device to perform downlink processing and the information used for the terminal device to perform downlink processing.

It should be noted that, a cellular scenario is used as an example for description herein, and the solution is applicable to sidelink communication. For example, if the to-be-processed data is sidelink data, the first information may include information used for the terminal device to perform uplink processing in sidelink communication and/or information used for the terminal device to perform downlink processing in sidelink communication. This embodiment of this disclosure may further be applied to cellular communication and sidelink communication.

It should be understood that, the information used for the terminal device to perform uplink processing may be information used for the terminal device to send uplink data, and the information used for the terminal device to perform downlink processing may be information used for the terminal device to receive downlink data.

Optionally, in this embodiment of this disclosure, the determining, by the access network device according to the first information, whether to perform security processing on to-be-processed data includes: when the first information indicates a recommendation of whether to perform security processing on the to-be-processed data, determining, by the access network device according to subscription information of the terminal device and/or capability information of the terminal device, whether to perform security processing on the to-be-processed data.

For example, if a value of the first information received by the access network device is 10 or 11, the access network device may further determine whether to perform security processing on the to-be-processed data with reference to the subscription information of the terminal device and/or the capability information of the terminal device. For example, the capability information of the terminal device is a maximum data rate that can be supported by the terminal device to perform security processing. That is, the access network device may determine, according to the maximum data rate that can be supported by the terminal device to perform security processing, whether to perform security processing on the to-be-processed data.

With reference to the above description, the first information may include the information used for the terminal device to perform uplink processing and/or the information used for the terminal device to perform downlink processing. If the to-be-processed data is uplink data, the first information includes the information used for the terminal device to perform uplink processing. That is, the first information includes subscription information used for the terminal device to perform uplink processing and/or capability information used for the terminal device to perform uplink processing. When the first information indicates a recommendation of whether to perform security processing on the uplink data, the access network device may determine, according to the subscription information used for the terminal device to perform uplink processing and/or the capability information used for the terminal device to perform uplink processing, whether to perform security processing on the uplink data.

Alternatively, if the to-be-processed data is downlink data, the first information includes the information used for the terminal device to perform downlink processing, that is, the first information includes subscription information used for the terminal device to perform downlink processing and/or capability information used for the terminal device to perform downlink processing. When the first information indicates a recommendation of whether to perform security processing on the downlink data, the access network device determines, according to the subscription information used for the terminal device to perform downlink processing and/or the capability information used for the terminal device to perform downlink processing, whether to perform security processing on the downlink data.

If the capability information of the terminal device is a maximum data rate that can be supported by the terminal device to perform security processing, similarly, if the to-be-processed data is uplink data, the first information includes a maximum data rate that can be supported by the terminal device to perform uplink security processing. That is, the access network device determines, according to the maximum data rate that can be supported by the terminal device to perform uplink security processing, whether to perform security processing on the uplink data. If the to-be-processed data is downlink data, the first information includes a maximum data rate that can be supported by the terminal device to perform downlink security processing, that is, the access network device determines, according to the maximum data rate that can be supported by the terminal device to perform downlink security processing, whether to perform security processing on the downlink data.

Furthermore, the determining, by the access network device according to a maximum data rate that can be supported by the terminal device to perform security processing, whether to perform security processing on the to-be-processed data includes: determining, by the access network device, to perform security processing on the to-be-processed data in a first QoS, a first PDU session or a first bearer, where a data rate of the first QoS, a data rate of the first PDU session or a data rate of the first bearer is less than or equal to the maximum data rate; or determining, by the access network device, to perform security processing on the to-be-processed data in a plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate.

That is, when a data rate of a QoS, a data rate of a PDU or a data rate of a bearer is less than or equal to the maximum data rate that is supported by the terminal device to perform security processing, the access network device may perform security processing on the to-be-processed data in the QoS, the PDU or the bearer. Alternatively, when a sum of data rates of a plurality of QoSs, a sum of data rates of a plurality of PDUs or a sum of data rates of a plurality of bearers, for example, an aggregation maximum bit rate (AMBR), is less than or equal to the maximum data rate that is supported by the terminal device to perform security processing, the terminal device may perform security processing on the to-be-processed data in the plurality of QoSs, the plurality of PDUs or the plurality of bearers. When an average data rate of a plurality of QoSs, an average data rate of a plurality of PDUs or an average data rate of a plurality of bearers is less than or equal to the maximum data rate that is supported by the terminal device to perform security processing, the access network device may further perform security processing on any piece of to-be-processed data in the plurality of QoSs, the plurality of PDUs or the plurality of bearers. This embodiment of this disclosure is not limited thereto.

Similarly, if the to-be-processed data is uplink data, the first information includes the maximum data rate that can be supported by the terminal device to perform uplink security processing. The access network device determines to perform security processing on the uplink data in a first QoS, a first PDU session or a first bearer, where a data rate of the first QoS, a data rate of the first PDU session or a data rate of the first bearer is less than or equal to the maximum data rate that can be supported by the terminal device to perform uplink security processing; or the access network device determines to perform security processing on the uplink data in a plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate that can be supported by the terminal device to perform uplink security processing. If the to-be-processed data is downlink data, the first information includes the maximum data rate that can be supported by the terminal device to perform downlink security processing. The access network device determines to perform security processing on the downlink data in a first QoS, a first PDU session or a first bearer, where a data rate of the first QoS, a data rate of the first PDU session or a data rate of the first bearer is less than or equal to the maximum data rate that can be supported by the terminal device to perform downlink security processing; or the access network device determines to perform security processing on the downlink data in the plurality of QoSs, a plurality of PDU sessions or a plurality of bearers, where a sum of data rates of a plurality of QoSs, a sum of data rates of the plurality of PDU sessions or a sum of data rates of the plurality of bearers is less than or equal to the maximum data rate that can be supported by the terminal device to perform downlink security processing.

Optionally, in this embodiment of this disclosure, the determining, by the access network device according to a maximum data rate that can be supported by the terminal device to perform security processing, whether to perform security processing on the to-be-processed data includes: when a data rate assessed by the access network device is less than or equal to the maximum data rate, determining, by the access network device, to perform security processing on the to-be-processed data.

Specifically, the access network device may calculate, that is, assess, a data rate based on data received or sent in a period of time. For example, the access network device may perform Layer 2 measurement in a time period, to obtain a data rate. Layer 2 may be one kind of a service data adaptation protocol (SDAP) layer, a packet data convergence protocol (PDCP) layer or a radio link control (RLC) layer.

Layer 2 measurement belongs to the understanding of a person skilled in the art is not be described herein. However, it should be understood that Layer 2 in this embodiment of this disclosure includes, but is not limited to, each layer described above, or may be a media access control (MAC) layer or the like.

The access network device may obtain a corresponding data rate according to a size of a transmission block in a time period. It should be understood that, the access network device may assess the data rate in many ways, which include but are not limited to the foregoing embodiments.

Similarly, if the to-be-processed data is uplink data, the first information includes the maximum data rate that can be supported by the terminal device to perform uplink security processing. When the data rate assessed by the access network device is less than or equal to the maximum data rate that can be supported by the terminal device to perform uplink security processing, the access network device determines to perform security processing on the uplink data. If the to-be-processed data is downlink data, the first information includes the maximum data rate that can be supported by the terminal device to perform downlink security processing. When the data rate assessed by the access network device is less than or equal to the maximum data rate that can be supported by the terminal device to perform downlink security processing, the access network device determines to perform security processing on the downlink data.

As described above, it may be not necessary to distinguish whether the first information specifically includes the information used for the terminal device to perform uplink processing or the information used for the terminal device to perform downlink processing, the access network device performs security processing on uplink data or downlink data.

Based on the understanding of a person skilled in the art about the subscription information of the terminal device and the capability information of the terminal device, the technical solutions related in this embodiment of this disclosure are not limited to the foregoing embodiments.

Optionally, in this embodiment of this disclosure, the subscription information of the terminal device and the capability information of the terminal device may be provided by the core network device or may be provided by the terminal device. Alternatively, the subscription information of the terminal device may be provided by the core network device, and the capability information of the terminal device may be provided by the terminal device, and vice versa. That is, the subscription information and/or the capability information used for the terminal device to perform uplink processing may be provided by the core network device and/or the terminal device. Similarly, the subscription information and/or the capability information used for the terminal device to perform downlink processing may be provided by the core network device and/or the terminal device. It should be noted that, the subscription information and/or the capability information used for the terminal device to perform uplink processing and the subscription information and/or the capability information used for the terminal device to perform downlink processing may both be provided by the core network device or the terminal device, or may be provided by the core network device and the terminal device separately. This embodiment of this disclosure is not limited thereto.

Optionally, in this embodiment of this disclosure, the first information may be used for indicating the subscription information of the terminal device and/or the capability information of the terminal device. That is, if the core network device does not perform determination, a determination result is not provided to the access network device. Further, the access network device may determine, according to the subscription information of the terminal device and/or the capability information of the terminal device indicated by the first information, whether to perform security processing on the to-be-processed data.

Furthermore, the access network device may determine, according to the foregoing embodiments, whether to perform security processing on the to-be-processed data. For brevity, details are not described herein again.

It should be understood that, terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

Figure 3:
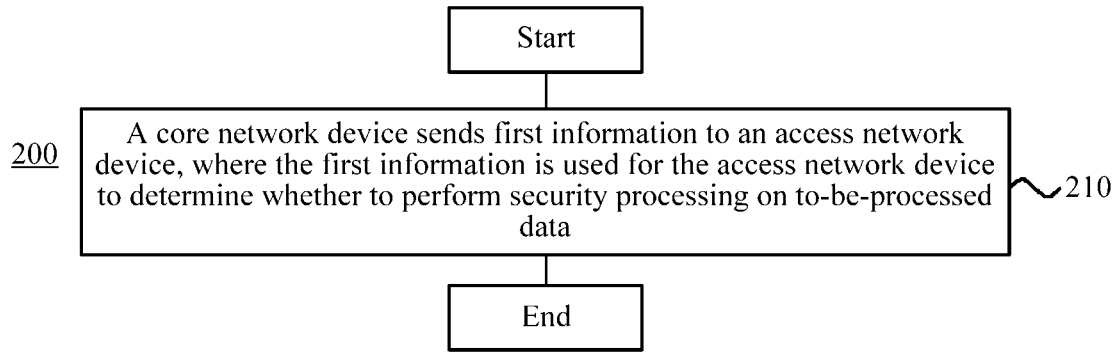
FIG. 3 is another schematic block diagram of a data processing method according to an implementation of this disclosure.

FIG. 3 is a schematic block diagram of a data processing method 200 according to an implementation of this disclosure. As shown in FIG. 3, the method 200 includes some or all of the following content:

S210: A core network device sends first information to an access network device, where the first information is used for the access network device to determine whether to perform security processing on to-be-processed data.

Therefore, according to the data processing method provided in this embodiment of this disclosure, the core network device provides auxiliary information to the access network device and determines, according to the auxiliary information, whether to perform security processing on the to-be-processed data, which is conducive to improving the performance of data transmission.

Optionally, in this embodiment of this disclosure, the first information is used for indicating one type of the following information: security processing is required to be performed on the to-be-processed data, security processing is not needed to be performed on the to-be-processed data, and a recommendation of whether to perform security processing on the to-be-processed data.

Optionally, in this embodiment of this disclosure, the first information includes information used for a terminal device to perform uplink processing and/or information used for the terminal device to perform downlink processing.

Optionally, in this embodiment of this disclosure, the method further includes: determining, by the core network device according to subscription information of the terminal device and/or capability information of the terminal device, whether to perform security processing on the to-be-processed data.

Optionally, in this embodiment of this disclosure, if the to-be-processed data is uplink data, the first information includes information used for the terminal device to perform uplink processing, and the core network device determines, according to the first information, whether to perform security processing on to-be-processed data, including: when the first information indicates a recommendation of whether to perform security processing on the uplink data, determining, by the core network device according to subscription information used for the terminal device to perform uplink processing and/or capability information used for the terminal device to perform uplink processing, whether to perform security processing on the uplink data.

Optionally, in this embodiment of this disclosure, if the to-be-processed data is downlink data, the first information includes the information used for the terminal device to perform downlink processing, and the core network device determines, according to the first information, whether to perform security processing on to-be-processed data, including: when the first information indicates a recommendation of whether to perform security processing on the downlink data, determining, by the core network device according to subscription information used for the terminal device to perform downlink processing and/or capability information used for the terminal device to perform downlink processing, whether to perform security processing on the downlink data.

Optionally, in this embodiment of this disclosure, the determining, by the core network device according to capability information of the terminal device, whether to perform security processing on the to-be-processed data includes: determining, by the core network device according to a maximum data rate that can be supported by the terminal device to perform security processing, whether to perform security processing on the to-be-processed data.

Optionally, in this embodiment of this disclosure, the determining, by the core network device according to capability information used for the terminal device to perform uplink processing, whether to perform security processing on the uplink data includes: determining, by the core network device according to the maximum data rate that can be supported by the terminal device to perform uplink security processing, whether to perform security processing on the uplink data.

Optionally, in this embodiment of this disclosure, the determining, by the core network device according to capability information used for the terminal device to perform downlink processing, whether to perform security processing on the downlink data includes: determining, by the core network device according to the maximum data rate that can be supported by the terminal device to perform downlink security processing, whether to perform security processing on the downlink data.

Optionally, in this embodiment of this disclosure, the determining, by the core network device according to a maximum data rate that can be supported by the terminal device to perform security processing, whether to perform security processing on the to-be-processed data includes: determining, by the core network device, to perform security processing on the to-be-processed data in a first QoS, a first PDU session or a first bearer, where a data rate of the first QoS, a data rate of the first PDU session or a data rate of the first bearer is less than or equal to the maximum data rate; or determining, by the core network device, to perform security processing on the to-be-processed data in a plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate.

Optionally, in this embodiment of this disclosure, the determining, by the core network device according to the maximum data rate that can be supported by the terminal device to perform uplink security processing, whether to perform security processing on the uplink data includes: determining, by the core network device, to perform security processing on the uplink data in a first QoS, a first PDU session or a first bearer, where a data rate of the first QoS, a data rate of the first PDU session or a data rate of the first bearer is less than or equal to the maximum data rate that can be supported by the terminal device to perform uplink security processing; or determining, by the core network device, to perform security processing on the uplink data in a plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate that can be supported by the terminal device to perform uplink security processing.

Optionally, in this embodiment of this disclosure, the determining, by the core network device according to the maximum data rate that can be supported by the terminal device to perform downlink security processing, whether to perform security processing on the downlink data includes: determining, by the core network device, to perform security processing on the downlink data in a first QoS, a first PDU session or a first bearer, where a data rate of the first QoS, a data rate of the first PDU session or a data rate of the first bearer is less than or equal to the maximum data rate that can be supported by the terminal device to perform downlink security processing; or determining, by the core network device, to perform security processing on the downlink data in a plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate that can be supported by the terminal device to perform downlink security processing.

Optionally, in this embodiment of this disclosure, the determining, by the core network device according to a maximum data rate that can be supported by the terminal device to perform security processing, whether to perform security processing on the to-be-processed data includes: when a data rate assessed by the access network device is less than or equal to the maximum data rate, determining, by the core network device, to perform security processing on the to-be-processed data.

The core network device assesses a data rate in a manner similar to that of an access network device, and excessive examples are not shown herein.

Optionally, in this embodiment of this disclosure, the first information is used for indicating the subscription information of the terminal device and/or the capability information of the terminal device.

It should be understood that, interaction between the core network device and the access network device and related characteristics, functions, and the like described for the core network device correspond to related characteristics and functions of the access network device. Moreover, related content has been described in detail in the foregoing method 100. For brevity, details are not described herein again.

It should further be understood that sequence numbers of the foregoing processes do not mean execution sequences in various embodiments of this disclosure. The execution sequences of the processes should be determined according to functions and internal logic of the processes, and should not be construed as any limitation on the implementation processes of the embodiments of this disclosure.

The data processing method according to the embodiment of this disclosure is described above in detail. Data processing apparatuses according to the embodiment of this disclosure are described below with reference to FIG. 4 to FIG. 7. Technical features described in the method embodiments are applicable to the following apparatus embodiments.

Figure 4:
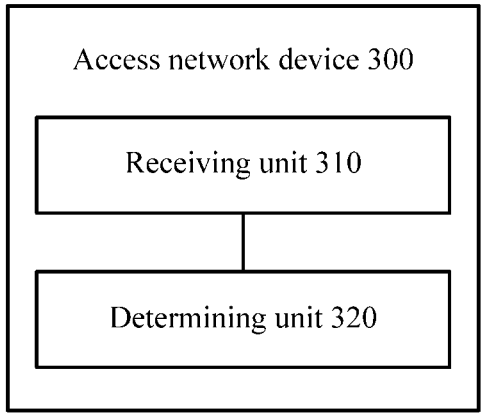
FIG. 4 is a schematic block diagram of an access network device according to an implementation of this disclosure.

FIG. 4 is a schematic block diagram of an access network device 300 according to an implementation of this disclosure. As shown in FIG. 4, the access network device 300 includes:

a receiving unit 310, configured to receive first information sent by a core network device or a terminal device; and a determining unit 320, configured to determine, according to the first information, whether to perform security processing on to-be-processed data.

Therefore, the access network device provided in this embodiment of this disclosure determines, according to auxiliary information obtained from the core network device or the terminal device, whether to perform security processing on the to-be-processed data, which is conducive to improving the performance of data transmission.

Optionally, in this embodiment of this disclosure, the receiving unit 310 is specifically configured to: receive the first information sent by the core network device, where the first information is used for indicating one type of the following information: security processing is required to be performed on the to-be-processed data, security processing is not needed to be performed on the to-be-processed data, and a recommendation of whether to perform security processing on the to-be-processed data.

Optionally, in this embodiment of this disclosure, the first information may include information used for the terminal device to perform uplink processing and/or information used for the terminal device to perform downlink processing.

Optionally, in this embodiment of this disclosure, the determining unit 320 is specifically configured to: when the first information indicates a recommendation of whether to perform security processing on the to-be-processed data, determine, according to subscription information of the terminal device and/or capability information of the terminal device, whether to perform security processing on the to-be-processed data.

Optionally, in this embodiment of this disclosure, if the to-be-processed data is uplink data, the first information includes the information used for the terminal device to perform uplink processing; and the determining unit 320 is specifically configured to: when the first information indicates a recommendation of whether to perform security processing on the uplink data, determine, according to subscription information used for the terminal device to perform uplink processing and/or capability information used for the terminal device to perform uplink processing, whether to perform security processing on the uplink data.

Optionally, in this embodiment of this disclosure, if the to-be-processed data is uplink data, the first information includes the information used for the terminal device to perform uplink processing; and the determining unit 320 is specifically configured to: when the first information indicates a recommendation of whether to perform security processing on the uplink data, determine, according to subscription information used for the terminal device to perform uplink processing and/or capability information used for the terminal device to perform uplink processing, whether to perform security processing on the uplink data.

Optionally, in this embodiment of this disclosure, the determining unit 320 is specifically configured to: determine, according to a maximum data rate that can be supported by the terminal device to perform security processing, whether to perform security processing on the to-be-processed data.

Optionally, in this embodiment of this disclosure, the determining unit 320 is specifically configured to: determine, according to a maximum data rate that can be supported by the terminal device to perform uplink security processing, whether to perform security processing on the uplink data.

Optionally, in this embodiment of this disclosure, the determining unit is specifically configured to: determine, according to a maximum data rate that can be supported by the terminal device to perform downlink security processing, whether to perform security processing on the downlink data.

Optionally, in this embodiment of this disclosure, the determining unit 320 is configured to: determine to perform security processing on the to-be-processed data in a first QoS, a first PDU session or a first bearer, where a data rate of the first QoS, a data rate of the first PDU session or a data rate of the first bearer is less than or equal to the maximum data rate; or determine to perform security processing on the to-be-processed data in a plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate.

Optionally, in this embodiment of this disclosure, the determining unit 320 is specifically configured to: determine to perform security processing on the uplink data in a first QoS, a first PDU session or a first bearer, where a data rate of the first QoS, a data rate of the first PDU session or a data rate of the first bearer is less than or equal to the maximum data rate that can be supported by the terminal device to perform uplink security processing; or determine to perform security processing on the uplink data in the plurality of QoSs, a plurality of PDU sessions or a plurality of bearers, where a sum of data rates of a plurality of QoSs, a sum of data rates of the plurality of PDU sessions or a sum of data rates of the plurality of bearers is less than or equal to the maximum data rate that can be supported by the terminal device to perform uplink security processing.

Optionally, in this embodiment of this disclosure, the determining unit 320 is specifically configured to: determine to perform security processing on the downlink data in a first QoS, a first PDU session or a first bearer, where a data rate of the first QoS, a data rate of the first PDU session or a data rate of the first bearer is less than or equal to the maximum data rate that can be supported by the terminal device to perform downlink security processing; or determine to perform security processing on the downlink data in the plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate that can be supported by the terminal device to perform downlink security processing.

Optionally, in this embodiment of this disclosure, the determining unit 310 is specifically configured to: when a data rate assessed by the access network device 300 is less than or equal to the maximum data rate, determine to perform security processing on the to-be-processed data.

Optionally, in this embodiment of this disclosure, the determining unit 320 is specifically configured to: when a data rate assessed by the access network device is less than or equal to the maximum data rate that can be supported by the terminal device to perform uplink security processing, determine to perform security processing on the uplink data.

Optionally, in this embodiment of this disclosure, the determining unit 320 is specifically configured to: when a data rate assessed by the access network device is less than or equal to the maximum data rate that can be supported by the terminal device to perform uplink security processing, determine to perform security processing on the uplink data.

Optionally, in this embodiment of this disclosure, the subscription information of the terminal device and/or the capability information of the terminal device are/is provided by the core network device or the terminal device.

Optionally, in this embodiment of this disclosure, the first information is used for indicating subscription information of the terminal device and/or capability information of the terminal device.

It should be understood that, the access network device 300 according to this embodiment of this disclosure may correspond to the access network device in the method embodiments of this disclosure, and the foregoing and other operations and/or functions of units in the access network device 300 are respectively used to implement corresponding procedures of the access network device in the method in FIG. 2. For brevity, details are not described herein again.

Figure 5:
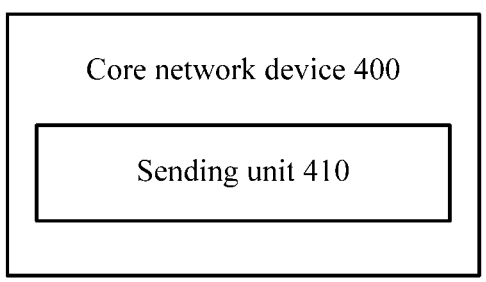
FIG. 5 is a schematic block diagram of a core network device according to an implementation of this disclosure.

FIG. 5 is a schematic block diagram of a core network device 400 according to an implementation of this disclosure. As shown in FIG. 5, the core network device 400 includes:

a sending unit 410, configured to send first information to an access network device, where the first information is used for the access network device to determine whether to perform security processing on to-be-processed data.

Therefore, the core network device provided in this embodiment of this disclosure determines whether to perform security processing on the to-be-processed data by providing auxiliary information for the access network device, which is conducive to improving the performance of data transmission.

Optionally, in this embodiment of this disclosure, the first information is used for indicating one type of the following information: security processing is required to be performed on the to-be-processed data, security processing is not needed to be performed on the to-be-processed data, and a recommendation of whether to perform security processing on the to-be-processed data.

Optionally, in this embodiment of this disclosure, the first information may include information used for a terminal device to perform uplink processing and/or information used for the terminal device to perform downlink processing.

Optionally, in this embodiment of this disclosure, the core network device further includes: a determining unit 420, configured to determine, according to subscription information of the terminal device and/or capability information of the terminal device, whether to perform security processing on the to-be-processed data.

Optionally, in this embodiment of this disclosure, if the to-be-processed data is uplink data, the first information includes information used for the terminal device to perform uplink processing, and the core network device further includes:

a determining unit 420, configured to: when the first information indicates a recommendation of whether to perform security processing on the uplink data, determine, according to subscription information used for the terminal device to perform uplink processing and/or capability information used for the terminal device to perform uplink processing, whether to perform security processing on the uplink data.

Optionally, in this embodiment of this disclosure, if the to-be-processed data is downlink data, the first information includes the information used for the terminal device to perform downlink processing, and the core network device further includes:

a determining unit 420, configured to: when the first information indicates a recommendation of whether to perform security processing on the downlink data, determine, according to subscription information used for the terminal device to perform downlink processing and/or capability information used for the terminal device to perform downlink processing, whether to perform security processing on the downlink data.

Optionally, in this embodiment of this disclosure, the determining unit 420 is specifically configured to: determine, according to a maximum data rate that can be supported by the terminal device to perform security processing, whether to perform security processing on the to-be-processed data.

Optionally, in this embodiment of this disclosure, the determining unit 420 is specifically configured to: determine, according to a maximum data rate that can be supported by the terminal device to perform uplink security processing, whether to perform security processing on the uplink data.

Optionally, in this embodiment of this disclosure, the determining unit 420 is specifically configured to: determine, according to a maximum data rate that can be supported by the terminal device to perform downlink security processing, whether to perform security processing on the downlink data.

Optionally, in this embodiment of this disclosure, the determining unit 420 is configured to: determine to perform security processing on the to-be-processed data in a first QoS, a first PDU session or a first bearer, where a data rate of the first QoS, a data rate of the first PDU session or a data rate of the first bearer is less than or equal to the maximum data rate; or determine to perform security processing on the to-be-processed data in a plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate.

Optionally, in this embodiment of this disclosure, the determining unit 420 is specifically configured to: determine to perform security processing on the uplink data in a first QoS, a first PDU session or a first bearer, where a data rate of the first QoS, a data rate of the first PDU session or a data rate of the first bearer is less than or equal to the maximum data rate that can be supported by the terminal device to perform uplink security processing; or determine to perform security processing on the uplink data in a plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate that can be supported by the terminal device to perform uplink security processing.

Optionally, in this embodiment of this disclosure, the determining unit 420 is specifically configured to: determine to perform security processing on the downlink data in a first QoS, a first PDU session or a first bearer, where a data rate of the first QoS, a data rate of the first PDU session or a data rate of the first bearer is less than or equal to the maximum data rate that can be supported by the terminal device to perform downlink security processing; or determine to perform security processing on the downlink data in a plurality of QoSs, a plurality of PDU sessions or a plurality of bearers, where a sum of data rates of the plurality of QoSs, a sum of data rates of the plurality of PDU sessions or a sum of data rates of the plurality of bearers is less than or equal to the maximum data rate that can be supported by the terminal device to perform downlink security processing.

Optionally, in this embodiment of this disclosure, the first information is used for indicating subscription information of the terminal device and/or capability information of the terminal device.

It should be understood that, the core network device 400 according to this embodiment of this disclosure may correspond to the core network device in the method embodiments of this disclosure, and the foregoing and other operations and/or functions of units in the core network device 400 are respectively used to implement corresponding procedures of the core network device in the method in FIG. 3. For brevity, details are not described herein again.

Figure 6:
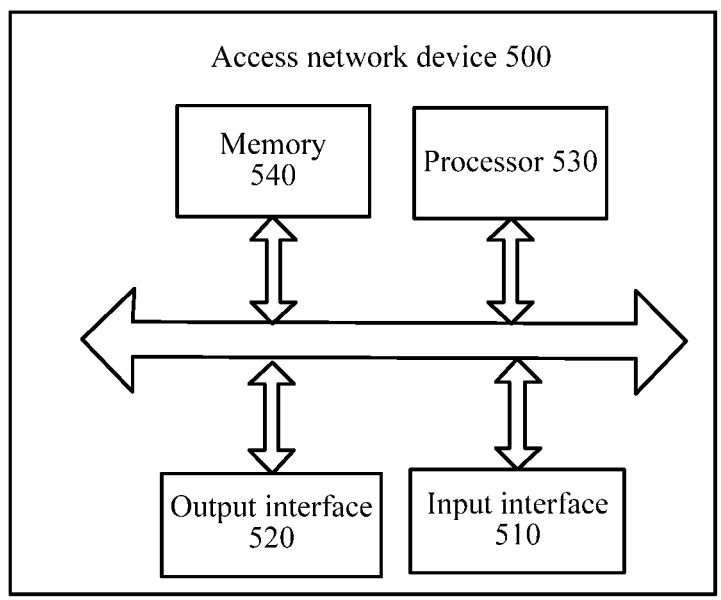
FIG. 6 is another schematic block diagram of an access network device according to an implementation of this disclosure.

As shown in FIG. 6, an implementation of this disclosure further provides an access network device 500. The access network device 500 may be the access network device 300 in FIG. 4, and may be configured to perform content of the access network device corresponding to the method 100 in FIG. 2. The access network device 500 includes: an input interface 510, an output interface 520, a processor 530, and a memory 540, and the input interface 510, the output interface 520, the processor 530, and the memory 540 may be connected by a bus system. The memory 540 is configured to store a program, an instruction or a code. The processor 530 is configured to execute the program, the instruction or the code in the memory 540, so as to control the input interface 510 to receive a signal, control the output interface 520 to send a signal, and complete operations in the foregoing method embodiments.

Therefore, the access network device provided in this embodiment of this disclosure determines, according to auxiliary information obtained from a core network device or a terminal device whether to perform security processing on to-be-processed data, which is conducive to improving the performance of data transmission.

It should be understood that, in this embodiment of this disclosure, the processor 530 may be a central processing unit (CPU), and the processor 530 may be another general-purpose processor, a digital signal processor, an disclosure-specific integrated circuit, a field programmable gate array, or another programmable logical device, discrete gate or transistor logical device, or discrete hardware component or the like. The general-purpose processor may be a microprocessor, or the processor may be any conventional processor or the like.

The memory 540 may include a read-only memory (ROM) and a random access memory (RAM), and provide an instruction and data to the processor 530. A part of the memory 540 may further include a non-volatile RAM. For example, the memory 540 may further store information about a device type.

In an implementation process, each piece of content of the foregoing methods may be implemented by a hardware-integrated logic circuit in the processor 530 or by an instruction in a software form. The content of the method disclosed with reference to the embodiments of this disclosure may be directly performed by a hardware processor, or may be performed by using a combination of hardware and a software module in the processor. The software module may be located in a mature storage medium in the art such as a RAM, a flash memory, a ROM, a programmable ROM, an electrically erasable programmable memory or a register. The storage medium is located in the memory 540, and the processor 530 reads information in the memory 540 and completes the content in the foregoing methods in combination with hardware of the processor. To avoid repetition, details are not described herein again.

In a specific implementation, the receiving unit in the access network device 300 may be implemented by the input interface 510 in FIG. 6 or a transceiver, and the determining unit in the access network device 300 may be implemented by the processor 530 in FIG. 6.

Figure 7:
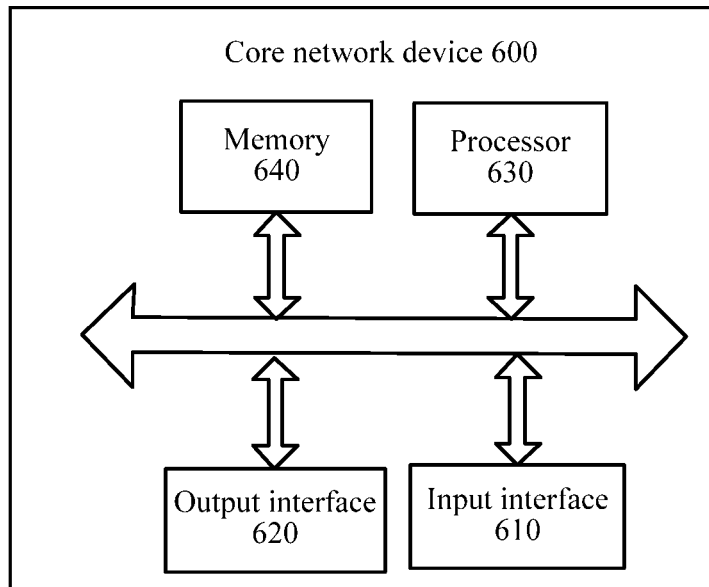
FIG. 7 is another schematic block diagram of a core network device according to an implementation of this disclosure.

As shown in FIG. 7, an implementation of this disclosure further provides a core network device 600, and the core network device 600 may be the core network device 400 in FIG. 5, and may be configured to perform content of the core network device corresponding to the method 200 in FIG. 3. The core network device 600 includes: an input interface 610, an output interface 620, a processor 630, and a memory 640, and the input interface 610, the output interface 620, the processor 630, and the memory 640 may be connected by a bus system. The memory 640 is configured to store a program, an instruction or a code. The processor 630 is configured to execute the program, the instruction or the code in the memory 640, so as to control the input interface 610 to receive a signal, control the output interface 620 to send a signal, and complete operations in the foregoing method embodiments.

Therefore, the core network device provided in this embodiment of this disclosure determines whether to perform security processing on to-be-processed data by providing auxiliary information for the access network device, which is conducive to improving the performance of data transmission.

It should be understood that, in this embodiment of this disclosure, the processor 630 may be a CPU, and the processor 630 may be another general-purpose processor, a digital signal processor, an application-specific integrated circuit, a field programmable gate array, or another programmable logical device, discrete gate or transistor logical device, or discrete hardware component or the like. The general-purpose processor may be a microprocessor, or the processor may be any conventional processor or the like.

The memory 640 may include a ROM and a RAM, and provide an instruction and data to the processor 630. A part of the memory 640 may further include a non-volatile RAM. For example, the memory 640 may further store information about a device type.

In an implementation process, each piece of content of the foregoing methods may be implemented by a hardware-integrated logic circuit in the processor 630 or by an instruction in a software form. The content of the method disclosed with reference to the embodiments of this disclosure may be directly performed by a hardware processor, or may be performed by using a combination of hardware and a software module in the processor. The software module may be located in a mature storage medium in the art such as a RAM, a flash memory, a ROM, a programmable ROM, an electrically erasable programmable memory or a register. The storage medium is located in the memory 640, and the processor 630 reads information in the memory 640 and completes the content in the foregoing methods in combination with hardware of the processor. To avoid repetition, details are not described herein again.

In a specific implementation, the sending unit in the core network device 400 may be implemented by the output interface 620 in FIG. 7 or a transceiver. The determining unit in the core network device 400 may be implemented by the processor 630 in FIG. 7.

Figure 8:
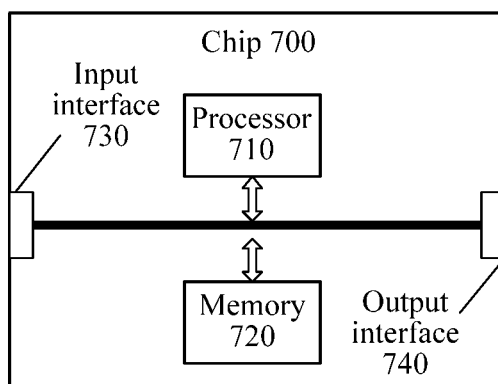
FIG. 8 is a schematic block diagram of a chip according to an implementation of this disclosure.

FIG. 8 is a schematic structural diagram of a chip according to an implementation of this disclosure. A chip 700 shown in FIG. 8 includes a processor 710. The processor 710 may invoke a computer program from a memory and run the computer program, to implement the method in this embodiment of this disclosure.

Optionally, as shown in FIG. 8, the chip 700 may further include a memory 720. The processor 710 may invoke the computer program from the memory 720 and run the computer program, to implement the method in this embodiment of this disclosure.

The memory 720 may be a component independent of the processor 710, or may be integrated into the processor 710.

Optionally, the chip 700 may further include an input interface 730. The processor 710 may control the input interface 730 to communicate with another device or chip, and specifically, may obtain information or data sent by another device or chip.

Optionally, the chip 700 may further include an output interface 740. The processor 710 may control the output interface 740 to communicate with another device or chip, and specifically, may output information or data to another device or chip.

Optionally, the chip may be applied to the access network device in the embodiments of this disclosure, and the chip may implement corresponding procedures implemented by the access network device in various methods in the embodiments of this disclosure. For brevity, details are not described herein again.

Optionally, the chip may be applied to the core network device in the embodiments of this disclosure, and the chip may implement corresponding procedures implemented by the core network device in various methods in the embodiments of this disclosure. For brevity, details are not described herein again.

It should be noted that, the chip mentioned in this embodiment of this disclosure may also be referred to as a system-level chip, a system chip, a chip system, a system on chip or the like.

Figure 9:
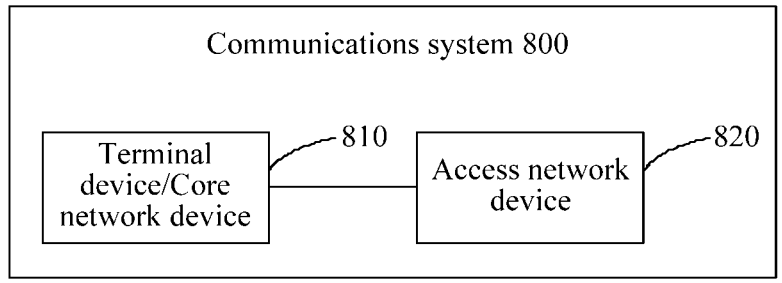
FIG. 9 is a schematic block diagram of a communications system according to an implementation of this disclosure.

FIG. 9 is a schematic block diagram of a communications system 800 according to an implementation of this disclosure. As shown in FIG. 9, the communications system 800 includes a terminal device 810 or a core network device 810 and an access network device 820.

The core network device 810 is applicable to implement corresponding functions implemented by the core network device in the foregoing methods, and the access network device 820 is applicable to implement corresponding functions implemented by the access network device in the foregoing methods. For brevity, details are not described herein again.

An embodiment of this disclosure further provides a computer-readable storage medium, which is configured to store a computer program.

Optionally, the computer-readable storage medium may be applied to the access network device in the embodiments of this disclosure, where the computer program enables a computer to implement corresponding procedures implemented by the access network device in various methods in the embodiments of this disclosure. For brevity, details are not described herein again.

Optionally, the computer-readable storage medium may be applied to the core network device in the embodiments of this disclosure, where the computer program enables a computer to implement corresponding procedures implemented by a mobile terminal/the core network device in various methods in the embodiments of this disclosure. For brevity, details are not described herein again.

An embodiment of this disclosure further provides a computer program product, which includes a computer program instruction.

Optionally, the computer program product may be applied to the access network device in the embodiments of this disclosure, and the computer program instruction enables a computer to implement corresponding procedures implemented by the access network device in various methods in the embodiments of this disclosure. For brevity, details are not described herein again.

Optionally, the computer program product may be applied to the core network device in the embodiments of this disclosure, and the computer program instruction enables a computer to implement corresponding procedures implemented by a mobile terminal/the core network device in various methods in the embodiments of this disclosure. For brevity, details are not described herein again.

An embodiment of this disclosure further provides a computer program.

Optionally, the computer program may be applied to the access network device in the embodiments of this disclosure, and when the computer program is run on a computer, the computer is enabled to implement corresponding procedures implemented by the access network device in various methods in the embodiments of this disclosure. For brevity, details are not described herein again.

Optionally, the computer program may be applied to the core network device in the embodiments of this disclosure, and when the computer program is run on a computer, the computer is enabled to implement corresponding procedures implemented by the core network device in various methods in the embodiments of this disclosure. For brevity, details are not described herein again.

A person of ordinary skill in the art may notice that the exemplary units and algorithm steps described with reference to the embodiments disclosed in this specification may be implemented in electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this disclosure.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this disclosure, it should be understood that the disclosed system, apparatus, and method may be implemented in other manners. For example, the described apparatus embodiments are merely schematic. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in the form of a software functional module and sold or used as an independent product, the functions may be stored in a computer-readable storage medium. Based on such an understanding, the technical solutions of this disclosure essentially, or the part contributing to the prior art, or part of the technical solutions may be implemented in the form of a software product. A computer software product is stored in the storage medium, and includes several instructions for instructing a computer device (which may be a personal computer, a server, a network device or the like) to perform all or a part of the steps of the embodiments of this disclosure. The foregoing storage medium includes: any medium that may store program code, such as a Universal Serial Bus (USB) flash drive, a removable hard disk, a ROM, a RAM, a magnetic disk or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A data processing method, comprising:
receiving, by an access network device, first information sent by a core network device or a terminal device wherein the first information sent by the core network device is used for indicating one type of the following information: security processing is required to be performed on to-be-processed data, security processing is not needed to be performed on the to-be-processed data, and security processing is preferred to be performed on the to-be-processed data; and
determining, by the access network device according to the first information, whether to perform security processing on the to-be-processed data, comprising:
when the first information indicates that security processing is preferred to be performed on the to-be-processed data, determining, by the access network device according to capability information used for the terminal device to perform security processing, whether to perform security processing on the to-be-processed data;
wherein the determining, by the access network device according to capability information used for the terminal device to perform security processing, whether to perform security processing on the to-be-processed data comprises:
determining, by the access network device according to a maximum data rate that can be supported by the terminal device to perform security processing, whether to perform security processing on the to-be-processed data.

2. The method according to claim 1, wherein the determining, by the access network device according to the first information, whether to perform security processing on to-be-processed data comprises:
when the first information indicates that security processing is preferred to be performed on the to-be-processed data, determining, by the access network device according to subscription information of the terminal device and/or capability information of the terminal device, whether to perform security processing on the to-be-processed data.

3. The method according to claim 1, wherein when the to-be-processed data is uplink data, the first information comprises the information used for the terminal device to perform uplink processing, and the determining, by the access network device according to the first information, whether to perform security processing on to-be-processed data comprises:
when the first information indicates that security processing is preferred to be performed on the uplink data, determining, by the access network device according to subscription information used for the terminal device to perform uplink processing and/or capability information used for the terminal device to perform uplink processing, whether to perform security processing on the uplink data.

4. The method according to claim 1, wherein when the to-be-processed data is downlink data, the first information comprises the information used for the terminal device to perform downlink processing, and the determining, by the access network device according to the first information, whether to perform security processing on to-be-processed data comprises:
when the first information indicates that security processing is preferred to be performed on the downlink data, determining, by the access network device according to subscription information used for the terminal device to perform downlink processing and/or capability information used for the terminal device to perform downlink processing, whether to perform security processing on the downlink data.

5. The method according to claim 3, wherein the determining, by the access network device according to capability information used for the terminal device to perform uplink processing, whether to perform security processing on the uplink data comprises:
determining, by the access network device according to a maximum data rate that can be supported by the terminal device to perform uplink security processing, whether to perform security processing on the uplink data.

6. The method according to claim 4, wherein the determining, by the access network device according to capability information used for the terminal device to perform downlink processing, whether to perform security processing on the downlink data comprises:
determining, by the access network device according to a maximum data rate that can be supported by the terminal device to perform downlink security processing, whether to perform security processing on the downlink data.

7. The method according to claim 6, wherein the determining, by the access network device according to a maximum data rate that can be supported by the terminal device to perform downlink security processing, whether to perform security processing on the downlink data comprises:
determining, by the access network device, to perform security processing on the downlink data in a first quality of service (QoS), a first protocol data unit (PDU) session or a first bearer, wherein a data rate of the first QoS, a data rate of the first PDU session or a data rate of the first bearer is less than or equal to the maximum data rate that can be supported by the terminal device to perform downlink security processing; or
determining, by the access network device, to perform security processing on the downlink data in a plurality of QoSs, a plurality of PDU sessions or a plurality of bearers, wherein a sum of data rates of the plurality of QoS s, a sum of data rates of the plurality of PDU sessions or a sum of data rates of the plurality of bearers is less than or equal to the maximum data rate that can be supported by the terminal device to perform downlink security processing.

8. The method according to claim 6, wherein the determining, by the access network device according to a maximum data rate that can be supported by the terminal device to perform downlink security processing, whether to perform security processing on the downlink data comprises:
when a data rate assessed by the access network device is less than or equal to the maximum data rate that can be supported by the terminal device to perform downlink security processing, determining, by the access network device, to perform security processing on the downlink data.

9. The method according to claim 2, wherein the subscription information of the terminal device and/or the capability information of the terminal device are/is provided by the core network device or the terminal device.

10. The method according to claim 1, wherein the first information is used for indicating subscription information of the terminal device and/or capability information of the terminal device.

11. A data processing method, comprising:
sending, by a core network device, first information to an access network device, wherein the first information is used for the access network device to determine whether to perform security processing on to-be-processed data;
wherein the first information is used for indicating one type of the following information: security processing is required to be performed on the to-be-processed data, security processing is not needed to be performed on the to-be-processed data, and security processing is preferred to be performed on the to-be-processed data;
wherein the method further comprises:
determining, by the core network device according to the first information, whether to perform security processing on the to-be-processed data, comprising:
when the first information indicates that security processing is preferred to be performed on the to-be-processed data, determining, by the core network device according to capability information used for the terminal device to perform security processing, whether to perform security processing on the to-be-processed data;
wherein the determining, by the core network device according to capability information used for the terminal device to perform security processing, whether to perform security processing on the to-be-processed data comprises:
determining, by the core network device according to a maximum data rate that can be supported by the terminal device to perform security processing, whether to perform security processing on the to-be processed data.

12. The method according to claim 11, wherein the method further comprises:
determining, by the core network device according to subscription information of the terminal device and/or capability information of the terminal device, whether to perform security processing on the to-be-processed data.

13. The method according to claim 11, wherein when the to-be-processed data is uplink data, the first information comprises information used for the terminal device to perform uplink processing, and the determining, by the core network device according to the first information, whether to perform security processing on the to-be-processed data, comprising:
when the first information indicates that security processing is preferred to be performed on the uplink data, determining, by the core network device according to subscription information used for the terminal device to perform uplink processing and/or capability information used for the terminal device to perform uplink processing, whether to perform security processing on the uplink data.

14. The method according to claim 11, wherein when the to-be-processed data is downlink data, the first information comprises the information used for the terminal device to perform downlink processing, and the core network device determines, according to the first information, whether to perform security processing on to-be-processed data, comprising:
when the first information indicates that security processing is preferred to be performed on the downlink data, determining, by the core network device according to subscription information used for the terminal device to perform downlink processing and/or capability information used for the terminal device to perform downlink processing, whether to perform security processing on the downlink data.

15. The method according to claim 13, wherein the determining, by the core network device according to capability information used for the terminal device to perform uplink processing, whether to perform security processing on the uplink data comprises:
determining, by the core network device according to a maximum data rate that can be supported by the terminal device to perform uplink security processing, whether to perform security processing on the uplink data.

16. The method according to claim 14, wherein the determining, by the core network device according to capability information used for the terminal device to perform downlink processing, whether to perform security processing on the downlink data comprises:
determining, by the core network device according to a maximum data rate that can be supported by the terminal device to perform downlink security processing, whether to perform security processing on the downlink data.

17. The method according to claim 16, wherein the determining, by the core network device according to a maximum data rate that can be supported by the terminal device to perform downlink security processing, whether to perform security processing on the downlink data comprises:
determining, by the core network device, to perform security processing on the downlink data in a first quality of service (QoS), a first protocol data unit (PDU) session or a first bearer, wherein a data rate of the first QoS, a data rate of the first PDU session or a data rate of the first bearer is less than or equal to the maximum data rate that can be supported by the terminal device to perform downlink security processing; or
determining, by the core network device, to perform security processing on the downlink data in a plurality of QoSs, a plurality of PDU sessions or a plurality of bearers, wherein a sum of data rates of the plurality of QoSs, a sum of data rates of the plurality of PDU sessions or a sum of data rates of the plurality of bearers is less than or equal to the maximum data rate that can be supported by the terminal device to perform downlink security processing.

18. An access network device, wherein the access network device comprises:
a transceiver, configured to receive first information sent by a core network device or a terminal device; and
a processor, configured to determine, according to the first information, whether to perform security processing on to-be-processed data,
wherein the transceiver is configured to:
receive the first information sent by the core network device, wherein the first information is used for indicating one type of the following information: security processing is required to be performed on the to-be-processed data, security processing is not needed to be performed on the to-be-processed data, and security processing is preferred to be performed on the to-be-processed data;
wherein the processor is further configured to:
when the first information indicates that security processing is preferred to be performed on the to-be-processed data, determine, according to capability information used for the terminal device to perform security processing, whether to perform security processing on the to-be-processed data;
wherein the processor is further configured to:
determine, according to a maximum data rate that can be supported by the terminal device to perform security processing, whether to perform security processing on the to-be-processed data.

19. The access network device according to claim 18, wherein the processor is specifically configured to:
when the first information indicates that security processing is preferred to be performed on the to-be-processed data, determine, according to subscription information of the terminal device and/or capability information of the terminal device, whether to perform security processing on the to-be-processed data.

20. The access network device according to claim 18, wherein when the to-be-processed data is uplink data, the first information comprises the information used for the terminal device to perform uplink processing, and the processor is specifically configured to:
when the first information indicates that security processing is preferred to be performed on the uplink data, determine, according to subscription information used for the terminal device to perform uplink processing and/or capability information used for the terminal device to perform uplink processing, whether to perform security processing on the uplink data.

21. The access network device according to claim 18, wherein when the to-be-processed data is downlink data, the first information comprises the information used for the terminal device to perform downlink processing, and the processor is specifically configured to:
when the first information indicates that security processing is preferred to be performed on the downlink data, determine, according to subscription information used for the terminal device to perform downlink processing and/or capability information used for the terminal device to perform downlink processing, whether to perform security processing on the downlink data.

22. The access network device according to claim 20, wherein the processor is specifically configured to:
determine, according to a maximum data rate that can be supported by the terminal device to perform uplink security processing, whether to perform security processing on the uplink data.

23. The access network device according to claim 21, wherein the processor is specifically configured to:
determine, according to a maximum data rate that can be supported by the terminal device to perform downlink security processing, whether to perform security processing on the downlink data.

24. The access network device according to claim 23, wherein the processor is specifically configured to:
    determine to perform security processing on the downlink data in a first quality of service (QoS), a first protocol data unit (PDU) session or a first bearer, wherein a data rate of the first QoS, a data rate of the first PDU session or a data rate of the first bearer is less than or equal to the maximum data rate that can be supported by the terminal device to perform downlink security processing; or
    determine to perform security processing on the downlink data in a plurality of QoSs, a plurality of PDU sessions or a plurality of bearers, wherein a sum of data rates of the plurality of QoSs, a sum of data rates of the plurality of PDU sessions or a sum of data rates of the plurality of bearers is less than or equal to the maximum data rate that can be supported by the terminal device to perform downlink security processing.

25. The access network device according to claim 23, wherein the processor is specifically configured to:
    when a data rate assessed by the access network device is less than or equal to the maximum data rate that can be supported by the terminal device to perform downlink security processing, determine to perform security processing on the downlink data.

26. The access network device according to claim 19, wherein the subscription information of the terminal device and/or the capability information of the terminal device are/is provided by the core network device or the terminal device.

27. The access network device according to claim 18, wherein the first information is used for indicating subscription information of the terminal device and/or capability information of the terminal device.

* * * * *